March 25, 1969 W. GESSINGER ET AL 3,434,398
LIGHT METAL PISTON
Filed Sept. 8, 1967

INVENTORS
WERNER GESSINGER
WILHELM HOCKE
BY
Stephens, Huettig & O'Connell
ATTORNEYS March 25, 1969 W. GESSINGER ET AL 3,434,398
LIGHT METAL PISTON Filed Sept. 8, 1967 Sheet 2 of 2

INVENTORS
WERNER GESSINGER
WILHELM HOCKE
BY
Stephens, Huettig & O'Connell
ATTORNEYS

United States Patent Office 3,434,398
Patented Mar. 25, 1969

3,434,398
LIGHT METAL PISTON
Werner Gessinger, Kornwestheim, and Wilhelm Hocke, Stuttgart-Mohringen, Germany, assignors to Mahle Komm.-Ges., Stuttgart-Bad Cannstatt, Germany
Filed Sept. 8, 1967, Ser. No. 666,350
Claims priority, application Germany, Sept. 27, 1966, M 71,070
Int. Cl. F16j 1/04
U.S. Cl. 92—228                   1 Claim

ABSTRACT OF THE DISCLOSURE

A light metal piston has sheet metal inserts anchored in the piston pin bosses in the piston skirt for controlling thermal expansion of the skirt. Rectangular recesses in the outer surface of the skirt extend across the bosses. Ribs join the bosses to the piston head. Transverse slots extending between the ribs separate a portion of the skirt from the piston head. The ends of these slots lie in that part of the piston above the recesses and which is reinforced by the ribs so as to be relatively resistant to bending stresses.

---

This invention is for a light metal piston such as used in internal combustion engines. The piston has a piston head and a skirt which is partially separated from the piston head by transverse slots. Extending over the piston pin bosses on the outer surface of the skirt are rectangular recesses which have back walls constituting chords. The radial heat expansion of the skirt is controlled by means of sheet metal inserts anchored in the piston pin bosses and which extend parallel to the chord-like walls of the recesses in the vicinity of the piston pin bosses and having end portions parallel to the part of the skirt between such recesses.

In pistons having inserts for controlling heat expansion, the inserts act on the elastic deformations occurring in the light metal skirt during cooling after the pistons have cooled from the casting thereof and because the skirt returns from its shrunk form to its original form when the piston becomes heated while being used in an engine. The layer of light metal lies on the curved end portions of these inserts and is separated from the piston head by transverse slots. The controlling effect is less noticeable or perhaps does not exist in the chord-like wall of the recesses in the skirt at which portions of the skirt are the piston pin bosses and their bracing reinforcements against the piston bottom to produce a relatively rigid structure. On the other hand, the rectangular recesses in the skirt are desirable for weight-saving purposes and are provided with chord-like walls which extend into the piston interior for reinforcing the piston pin bosses. Most favorably, supporting ribs having only a moderate depth bear against the bottom of the piston. In order to utilize this advantage to its greatest extent without impairing too much the heat expansion controlling inserts, heretofore a little expansion in width has been held acceptable which, in turn, causes the chord-like walls to become shorter and with a constant and uniform overall width of the inserts further causes the curved end portions of the inserts to become correspondingly longer. Efforts have been made to construct the zones of the chord-like walls which lie outside of the reinforcing for the bosses as a wall that is as thin as possible and to keep them clear of reinforcing transverse ribs, at least within the area of the transverse slots.

Pistons so constructed have excellent performance during normal load capacity. However, when a higher load is applied, especially during the increase to a higher engine speed, tears tend to form at the ends of the transverse slots. Attempts to correct this fault by local reinforcing and increase of material as, for example, by using ribs in the form of bulging or protruding ribs embracing the ends of the slots have not been successful.

In this invention, pistons of this type have transverse slots which do not tear. In this invention, the skirt adjacent the piston head and above the rectangular recesses is constructed as a solid wall which forms a solid circular segmental skirt portion reinforcing the skirt and the drill hole ends at the ends of the slots are placed in this thickened portion with the distance between the drill hole ends of two adjacent slots being less than the distance of the center portions of the metal inserts.

Because of these features and contrary to heretofore used constructions, the recesses can be made deeper so that they are longer in the piston skirt portions which are separated from the piston head by the transverse slots. Also, they are not only locally reinforced but are overall reinforced. Therefore, aside from the skirt portions which are subject to the insert control, there are also present skirt portions which are separated from the piston head by transverse slots and which portions have been made rigid with regard to bending stresses and which, if viewed from the insert control alone, would seem rather superfluous. The advantage of this feature thus rests on the fact that the ends of the transverse slots lie between two zones of the pitson which are rigid with regard to bending stresses; namely, this is between the piston head which is rigid by its very nature and the reinforced and enlarged recesses in the skirt of this invention. The result is that the deformations which are produced in the skirt portions by the metal inserts and by the engine operating stresses, such as side pressures and centrifugal force pressures, no longer have a noticeable effect in the area of the slot ends. This is why within these areas the tendency to form tears proceeding from the ends of the slots no longer occurs.

The means by which the objects of this invention are obtained are described more fully with reference to the accompanying drawings in which:

FIGURE 2a is a cross-sectional view taken on the line IIa—IIa of FIGURE 1a.

Figure 1:
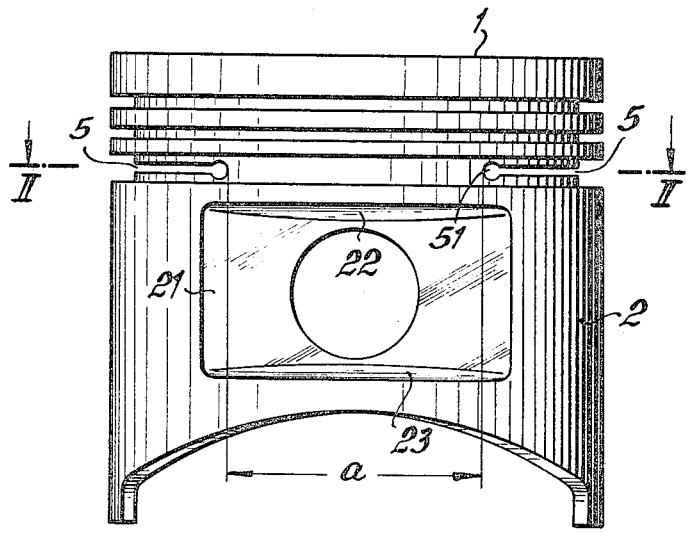
FIGURE 1 is a side elevational view of the piston of this invention.
Figure 2:
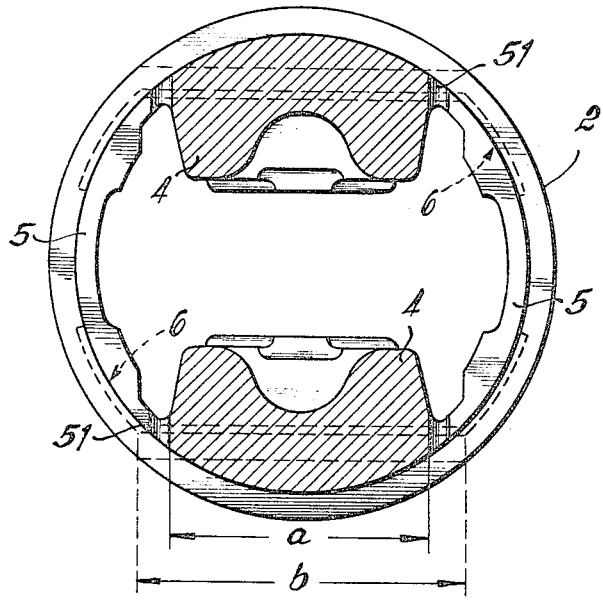
FIGURE 2 is a cross-sectional view taken on the line II—II of FIGURE 1.
Figure 1A:
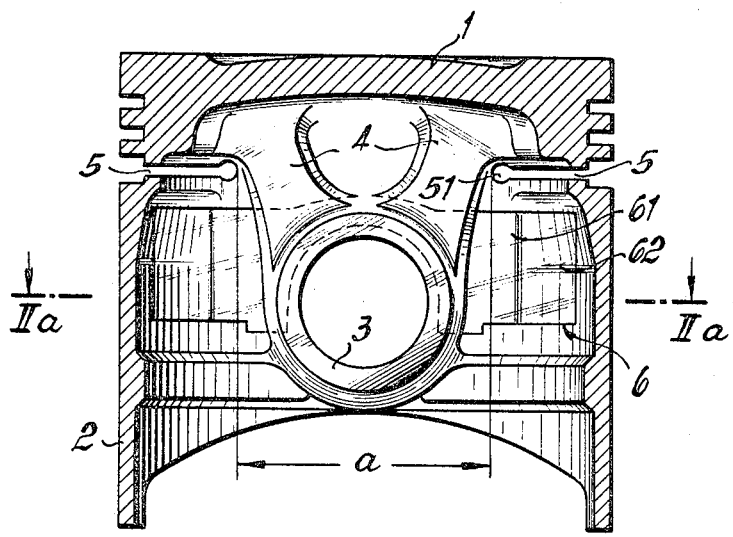
FIGURE 1a is a cross-sectional view through the piston.
Figure 2A:
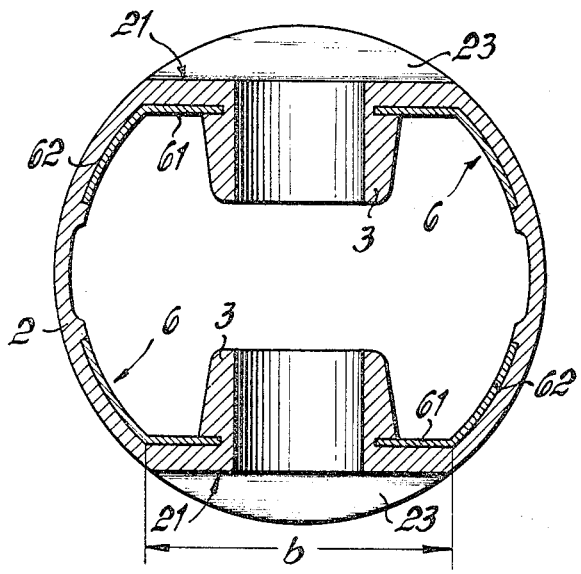

The piston is composed of a piston head 1 and a skirt 2 joined to the piston head in the vicinity of the piston ring zone adjacent the piston pin bosses 3. These bosses are connected with the piston head by means of ribs 4. The skirt portions between the piston pin bosses are separated from the piston head by transverse slots 5 which have drill hole ends 51. The piston skirt within the area of the bosses 3 has recesses 21, the back of which extends chord-like across the piston. Above and below the recesses, the piston skirt is solid with the transition from the recess to the piston skirt forming circular segmental solid ribs 22 and 23. The radial heat expansion is controlled by two sheet metal inserts 6 cast into the skirt which have their center portions 61 anchored in the piston bosses and parallel to the wall of recess 21 and end portions 62 which are parallel to the curvature of the piston skirt.

The widths $b$ of the center portions 61 of the inserts 6 which lie against and reinforce the wall of recess 21 are larger than the distance $a$ between the ends of two adjacent transverse slots 5. The drill hole ends 51 thus lie between two rigid piston zones and thus remain unaffected by the periodic changes in shape to which the more resilient parts of the piston are subject.

Having now described the means by which the objects of the invention are obtained, we claim:

1. A light metal piston for an internal combustion engine comprising a piston head, a piston skirt, piston pin bosses in said skirt, ribs joining said bosses and skirt to said piston head, rectangular recesses in the outer surface of said skirt and each having a back wall extending chordlike across its respective piston pin boss and rib and leaving a thick solid circular segmental skirt portion between the recess and said piston head, sheet metal inserts each having a center portion anchored in its piston boss and parallel to the bottom wall of said recess and end portions parallel to the part of the skirt between said recesses, said inserts controlling the radial heat expansion of said skirt, slots extending transversely of said piston for separating a portion of said piston head from said skirt between said ribs, said slots having drill hole ends positioned in said head above said circular segmental skirt portion, and the distance (a) between the drill hole ends of two adjacent slots being less than the distance (b) of the center portion (61) of the corresponding sheet metal insert.

References Cited

UNITED STATES PATENTS

| 1,792,504 | 2/1931 | Nelson | 92—228 |
| 2,080,286 | 5/1937 | Mahle | 92—228 |

FOREIGN PATENTS

| 429,145 | 5/1935 | Great Britain. |
| 701,291 | 12/1953 | Great Britain. |
| 1,140,023 | 11/1962 | Germany. |

CARROLL B. DORITY, JR., *Primary Examiner.*

U.S. Cl. X.R.

92—235